Oct. 28, 1924.
G. W. OLNEY
1,513,671
RING CUTTING MACHINE
Filed May 26, 1919    5 Sheets-Sheet 1
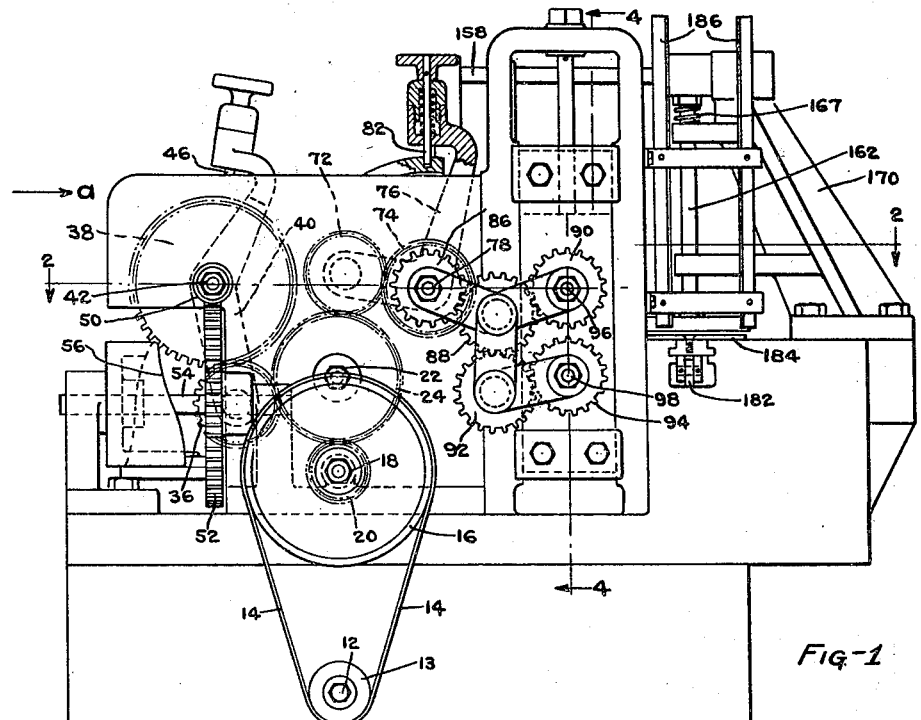
Fig-1
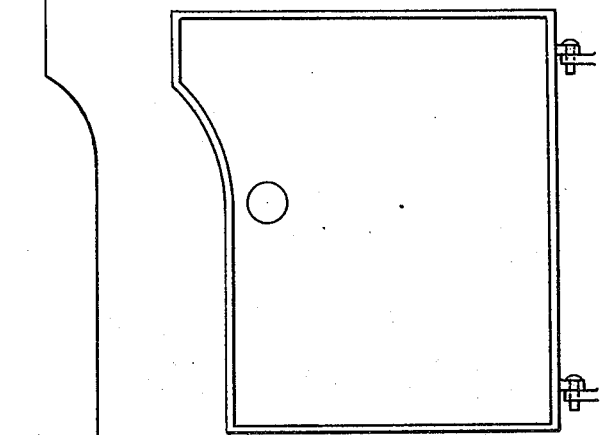
INVENTOR:
GEORGE W. OLNEY
BY Whiteley
and
Ruckman
ATTORNEYS

INVENTOR:
GEORGE W. OLNEY
ATTORNEYS.

Oct. 28, 1924.   1,513,671
G. W. OLNEY
RING CUTTING MACHINE
Filed May 26, 1919   5 Sheets-Sheet 3
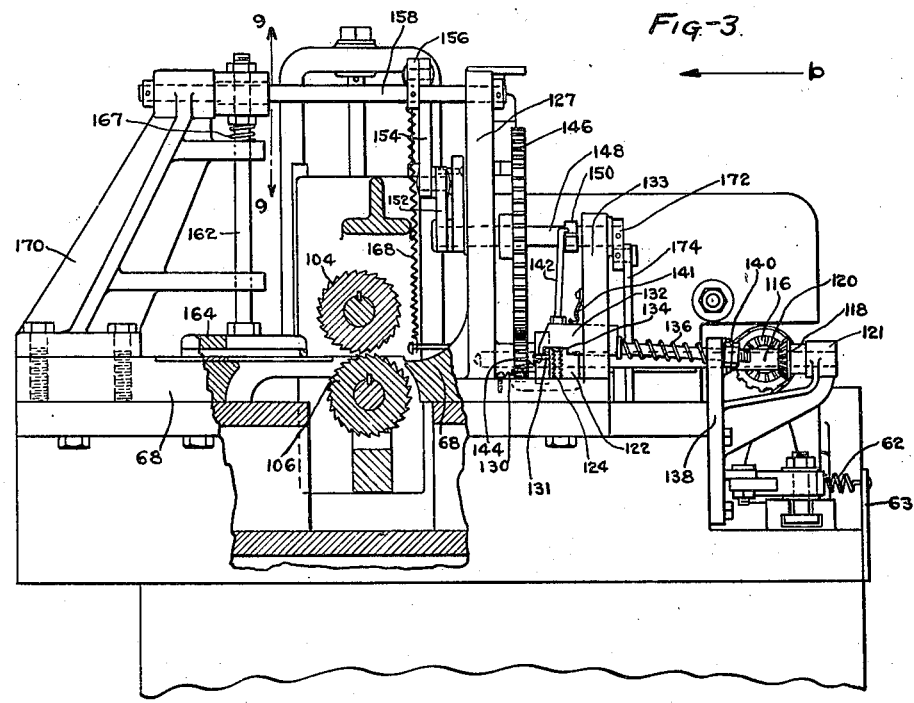
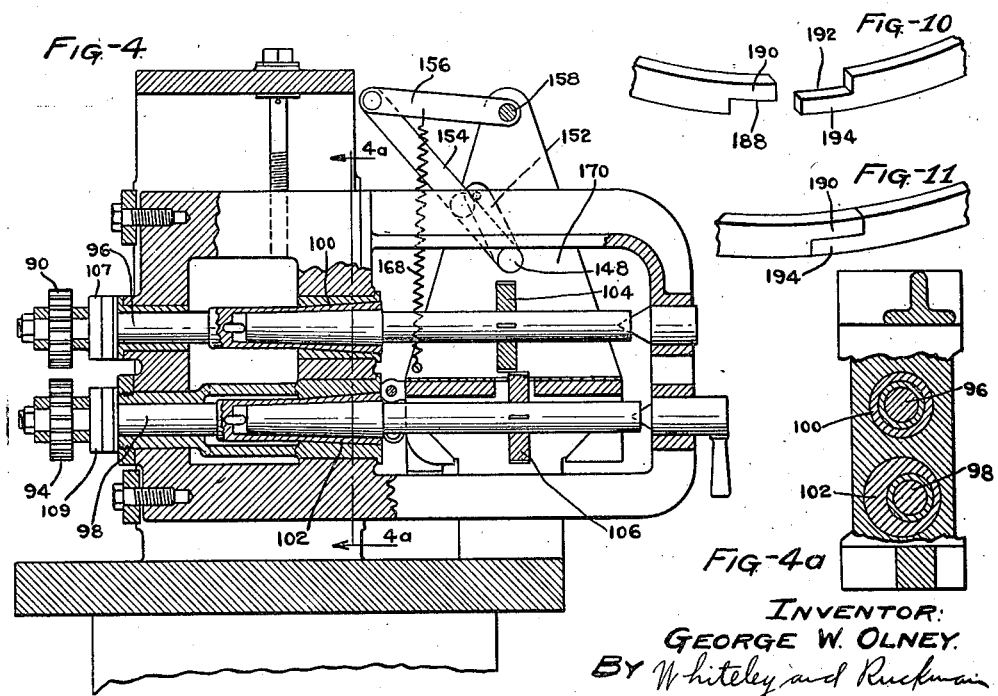
INVENTOR:
GEORGE W. OLNEY.
BY Whiteley and Ruckman
ATTORNEYS

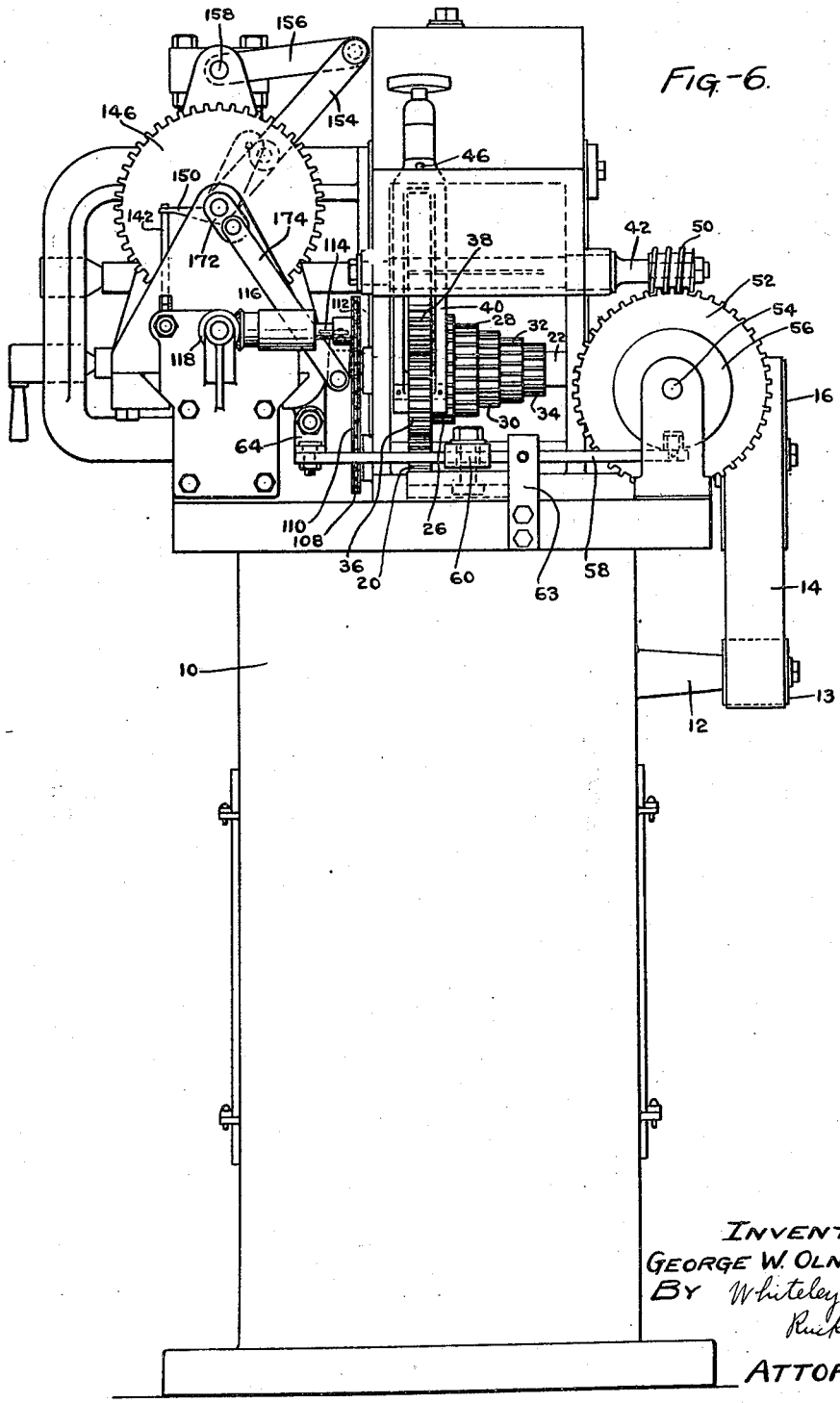

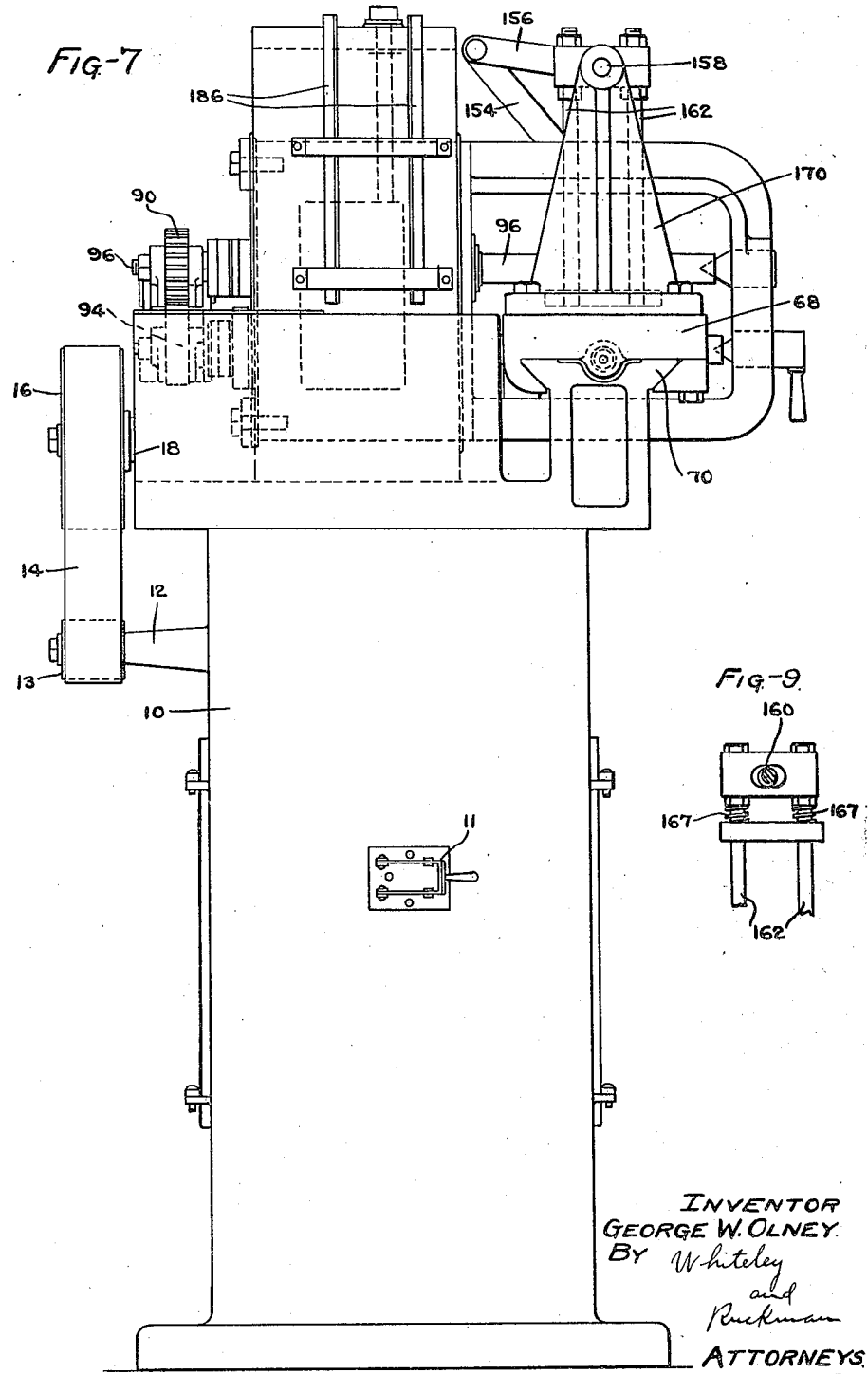

Patented Oct. 28, 1924.

1,513,671

UNITED STATES PATENT OFFICE.

GEORGE W. OLNEY, OF MINNEAPOLIS, MINNESOTA, ASSIGNOR TO BAKER VALVE COMPANY, OF MINNEAPOLIS, MINNESOTA, A CORPORATION.

RING-CUTTING MACHINE.

Application filed May 26, 1919. Serial No. 299,710.

*To all whom it may concern:*

Be it known that I, GEORGE W. OLNEY, a citizen of the United States, residing at Minneapolis, in the county of Hennepin and State of Minnesota, have invented certain new and useful Improvements in Ring-Cutting Machines, of which the following is a specification.

My invention relates to ring cutting machines and particularly to machines for cutting solid rings to form split piston rings. An object of my invention is to provide an automatic machine which will take solid rings one at a time from a stack of the same and feed them to milling cutters to produce step-cut piston rings having stepped or lapped joints to prevent leakage at the joints.

The full objects and advantages of my invention will appear in connection with the detailed description thereof and the novel features embodied in my inventive idea will be particularly pointed out in the claims.

Referring to the accompanying drawings, which illustrate the application of my invention,—

Figure 2:
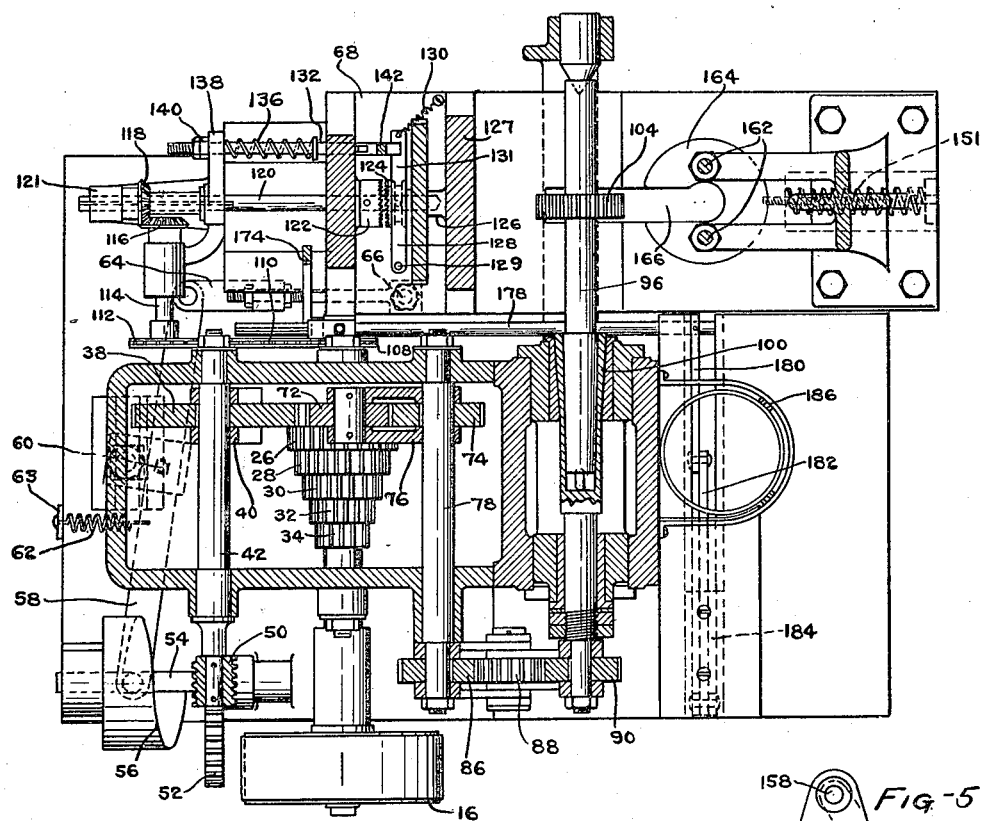
Figure 8:
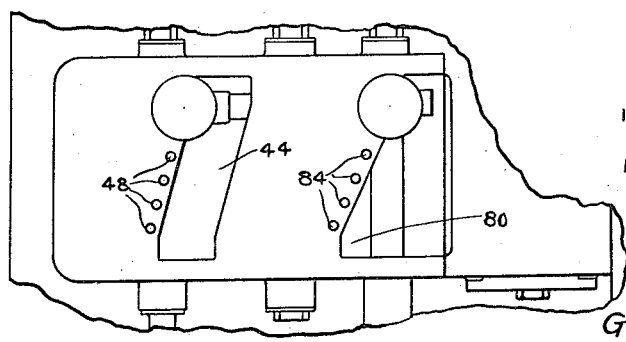
Figure 5:
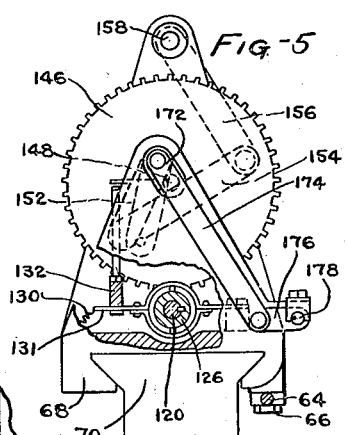

Fig. 1 is a view in side elevation with the position of some parts indicated in dotted lines. Fig. 2 is a substantially-horizontal section on the line 2—2 of Fig. 1. Fig. 3 is a sectional view with a portion of the frame appearing as a side elevation of the opposite side from that shown in Fig. 1. Fig. 4 is a view mostly in section on the line 4—4 of Fig. 1. Fig. 4ª is a detail view in section on the line 4ª—4ª of Fig. 4. Fig. 5 is a detail view looking in the direction of the arrow *b*, Fig. 3. Fig. 6 is a side view looking in the direction of the arrow *a*, Fig. 1. Fig. 7 is a view of the opposite side from that shown in Fig. 6. Fig. 8 is a detail top plan view. Fig. 9 is a view in section on the line 9—9 of Fig. 3, showing the eccentric for operating the clamp. Fig. 10 is a view showing the steps which are left when a ring is milled. Fig. 11 is a view showing how the steps on each end of the ring spring into the spaces which have been milled out.

As shown in the drawings, the machine is supported on a hollow base 10 to which is attached a switch 11 for switching on and off the current to an electric motor mounted within the hollow base. Upon the shaft 12 of the motor is a pulley 13 connected by a belt 14 with a pulley 16 on a driving shaft 18 mounted in bearings on the frame of the machine. Secured to the shaft 18 is a pinion 20 in mesh with a gear 24 secured to a countershaft 22 located above the shaft 18, as will be apparent from Figs. 1 and 2. Secured to the shaft 22 are a series of gears 26, 28, 30, 32 and 34, the gear 26 being smaller than the gear 24 and each in succession being smaller than the one preceding it, the largest gear 24 being indicated in Fig. 1 but being hidden in Fig. 2 by certain gears soon to be described. A gear 36 may be brought into mesh with any one of the stepped gears in the following manner. This gear 36 is held in mesh with a gear 38 by means of an arm 40 in the lower end of which the gear 36 is journaled, this arm being pivoted on a shaft 42 upon which the gear 38 is slidably mounted. As will be apparent from Figs. 1 and 2 the arm 40 is slidably and rotatably mounted on the shaft 42. The upper end of the arm 40 extends through an inclined slot 44 located in the horizontal top portion of the machine, as shown in Fig. 8, and this arm is provided with a spring-pressed detent 46 adapted to engage any one of a series of holes 48 in the top plate corresponding in number to the gears 24 to 34. Upon disengaging the detent 46 the upper end of the arm 40 may be moved along the inclined slot 44 and this movement will slide the intermeshing gears 36 and 38 longitudinally of the shaft 42, and on account of the turning movement of the lower end of the arm 40 will bring the gear 36 into mesh with the particular one of the step gears to which it is opposed. Provision is thus made for driving the shaft 42 at various speeds from the driving shaft 18. Upon the outer end of the shaft 42 is a worm 50 meshing with a worm gear 52 secured to a shaft 54 to which is also secured a face cam 56. This cam engages one end of a lever 58 adjustably pivoted to the frame at 60 by well known slot and pin connection, a spring 62 serving to keep the end of the lever in contact with the cam. The spring 62 is attached at one end to the lever 58 and the other end is attached to a post 63 secured to the framework of the machine. The other end of the lever 58 is attached to a link 64 which in turn is attached to a lug 66 secured to a table 68, the latter having a dovetailed recess in its lower side into which is fitted the dovetailed portion of a bed 70 as shown in Fig. 7 so that the table is securely mounted for sliding movement. A gear 72 may be brought into mesh with any one of the stepped gears 24 to 34 in the following manner. The gear 72 is held in mesh with a gear 74 by means of a bell-crank arm 76 in one end of which the gear 72 is journaled, and this arm is pivoted on a shaft 78 on which the gear 74 is slidably mounted. As will be apparent from Figs. 1 and 2 the arm 76 is slidably and rotatably mounted on the shaft 78. The upper end of the arm 76 extends through an inclined slot 80 located in the horizontal top portion of the machine as shown in Fig. 8, and this arm is provided with a spring-pressed detent 82 adapted to engage any one of a series of holes 84 in the top portion corresponding in number to the gears 24 to 34. Upon disengaging the detent 82 the upper end of the arm 76 may be moved along the inclined slot 80 and this movement will slide the intermeshing gears 72 and 74 longitudinally of the shaft 78, and on account of the turning motion of the lower end of the arm 76 will bring the gear 72 into mesh with the particular one of the stepped gears to which it is opposed. Provision is thus made for driving the shaft 78 at various speeds from the driving shaft 18, and the speeds of the shafts 78 and 42 may be varied relatively to each other. The shaft 42 causes reciprocation of the table 68 while the shaft 78 causes rotation of milling cutters soon to be described and therefore it is desirable to be able to vary the speeds of these shafts with reference to each other according to the character of the ring which is to be cut. On the front end of the shaft 78 is secured a pinion 86 meshing with a pinion 88. The latter pinion meshes with a pinion 90 and also with a pinion 92, the latter being in mesh with a pinion 94. The pinions 90 and 94 are secured to shafts 96 and 98, respectively, mounted in adjustable bearings 100 and 102 of well known construction, as shown in Fig. 4. Milling cutters 104 and 106 are secured to the shafts 96 and 98, these cutters being positioned to overlap each other as shown in Fig. 4, and the size of these cutters may be changed upon loosening the nuts 109 so that the distance between the shafts 96 and 98 may be changed to correspond with the size of cutters employed. This adjustment is permitted on account of the conical bearings 100 and 102. By referring to Fig. 1, it will be seen that this can be readily done on account of the manner in which the pinions 90 and 94 are driven. By referring to Fig. 4ª it will be seen that the bearing 102 is in the form of an eccentric and by referring to Fig. 4 it will be apparent that upon loosening the nuts 109 the eccentric bearing 102 may be turned so that the distance between the shafts 96 and 98 is adjusted. Upon the driving shaft 18 beyond the gear 20 is secured a sprocket wheel 108 over which passes a sprocket chain 110 which also passes over a sprocket wheel 112 secured to one end of a shaft 114. The other end of the shaft 114 has secured to it a bevel gear 116 meshing with a bevel gear 118 splined on a shaft 120 which is slidably and rotatably mounted at one end in an upright 121 on the frame. Upon the shaft 120 is secured a clutch member 122 with which is adapted to cooperate a clutch member 124 splined on a sleeve shaft 126 journaled on a standard 127 attached to the table 68. The end of the shaft 120 is rotatably mounted in the sleeve shaft. The clutch member 124 is normally held retracted from the clutch member 122 on account of being attached to a yoke 128 which is pivoted to the table at 129 and which at the other end has a spring 130 connecting it to the table 68 as shown in Fig. 2. The free end 131 of the yoke is extended in the form of an arm which underlies a bar 132 having a recess 134 in its lower side. The bar 132 extends through a slot in an upright member 133 on the table and is surrounded near one end by a spring 136 placed between the member 133 and a lug 138 secured to the frame, a nut 140 being placed on the bar outside of the lug. The bar 132 is normally held downwardly by a spring 141 attached to the upright 133. Secured to the bar 132 is an upstanding arm 142 having its upper end bent at a right angle. A pinion 144 is secured to the sleeve shaft 126 and this pinion meshes with a gear 146 secured to a shaft 148 having an arm 150 secured thereto which causes the clutch to act as a one-revolution clutch in the following manner. When the table has reached its extreme forward position the lever 58 is released from the high point of the cam 56, and the spring 62 in connection with a spring 151 secured to the table immediately restores the table to its rearward position. The end 131 of the yoke carrying the clutch member 124 engages with the rear shoulder of the recess 134 in bar 132. Since this bar is prevented from backward movement when the nut 140 engages the lug 138 on the frame, and since the arm 131 with its yoke 128 is pivoted to the table, which is moving rearwardly at this time, it follows that the clutch member 124 is brought into engagement with the clutch member 122, thus rotating the sleeve shaft 126 and the pinion 144, the latter being in mesh with the gear 146 which rotates the shaft 148. As soon as the latter shaft has made one revolution the arm 150 secured thereto lifts the arm 142 and the bar 132, thus releasing the end 131 of the yoke from the recess 134 and allowing the spring 130 to disengage the clutch, the end 131 at this time coming to rest under the thick portion of the bar back of the recess 134. When the table moves forward again the end 131 gradually moves forward until it reaches the recess 134, when the rear end of the bar 132 drops sufficiently to release the upper end of the arm 142 from the arm 150 so that the shaft 148 is in readiness to make another revolution at the proper time. The slot in the upright 133 through which the bar 132 passes permits this tilting movement of the latter. When the shaft 148 makes a revolution an arm 152 secured thereto pulls a link 154 which is pivoted to an arm 156 secured to a rock-shaft 158, which is thereby rocked. A portion 160 of this shaft, as shown in Fig. 9, is formed as an eccentric to depress rods 162 carrying a clamp 164 on the lower end thereof. This clamp is adapted to hold a ring to be milled and in connection with the table, feed the ring to the cutters 104 and 106, the clamp and table being slotted at 166 as shown in Fig. 2 to permit this operation. The shaft 158 is rocked by the connections previously described to depress the clamp 164 as the table is about to begin its forward movement, and this shaft is rocked oppositely to release the clamp for the backward movement of the table, and the clamp is raised by springs 167 surrounding the rods 162. A spring 168 attached to the arm 156 holds the latter downwardly when not lifted by the operation of the arm 152 and the connecting link 154. The rear end of the shaft 158 and the rods 162 are supported by a bracket portion 170 carried by the table. When the shaft 148 makes a revolution an arm 172 secured to the front end thereof pulls a link 174 pivoted to an arm 176 secured to a rock-shaft 178 which extends rearwardly as shown in Fig. 2. When the shaft 178 is rocked it pulls links 180 and 182 which connect this shaft with a pusher 184, causing the latter to remove the lower one of a stack of rings in a cage 186 which holds the rings so that they may be removed one at a time from the bottom. The pusher carries the ring thus removed to bring it underneath the clamp 164, at the same time ejecting the ring which has just been milled. The clamp then comes down on top of the ring which is to be milled and holds it securely upon the table.

The operation and advantages of my invention will be readily understood from the foregoing description. By means of the arm 40 and the detent 46 the gears 36 and 38 may be slid and locked in a number of positions, thus changing the speed at which the table is fed forward. By means of the arm 76 and the detent 82 the gears 72 and 74 may be slid and locked in a number of positions, thus changing the speed at which the milling cutters are operated. The operation of the machine is entirely automatic and it will continue to mill rings as long as there are any rings left in the stack from which they are supplied. The manner in which the rings are milled to produce step-cut piston rings will be apparent from Figs. 3 and 10. The cutter 106 removes the portion of the ring indicated at 188, leaving the step 190 while the cutter 104 removes the portion indicated at 192, leaving the step 194. When the ring has been milled and placed in a piston the split ends fit together to bring the steps into the position indicated in Fig. 11, thus making a tight joint.

I claim:

1. A ring cutting machine comprising two offset milling cutters, and means for taking rings one at a time from a stack of rings and feeding them to said cutters to form a step cut in said rings by a single cutting operation.

2. A ring cutting machine comprising two offset milling cutters, means for changing the speed of operation of said cutters, means for taking rings one at a time from a stack of rings and feeding them to said cutters to form a step cut in said rings by a single cutting operation, and means for changing the speed of operation of said feeding means.

3. A ring cutting machine comprising two offset milling cutters, means for changing the speed of operation of said cutters, means for taking rings one at a time from a stack of rings and feeding them to said cutters to form a step cut in said rings by a single cutting operation, and means for changing the speed of operation of said feeding means, each of said speed changing means being operable independently of the other.

4. A ring cutting machine comprising two offset milling cutters, means for taking rings one at a time from a stack of rings and feeding them to said cutters to form a step cut in said rings by a single cutting operation, means for clamping the rings upon the feeding means when the latter moves forwardly, and means for releasing the cut rings when the feeding means moves rearwardly.

5. A ring cutting machine comprising two offset milling cutters, a table for feeding rings to said cutters to form a step-cut in said rings, means for pushing rings one at a time from a stack of rings into position on said table, means for clamping said rings when said table is moving forwardly, and means for releasing the cut rings when said table moves rearwardly.

6. A ring cutting machine comprising two offset milling cutters, a driven shaft, a plurality of stepped gears secured to said shaft, means for driving said cutters from any one of said gears as desired, means for feeding rings to said cutters to form a step-cut in said rings, and means for driving said feeding means from any one of said gears as desired.

7. A ring cutting machine comprising two offset milling cutters, a driven shaft, a plurality of stepped gears secured to said shaft, means for driving said cutters from any one of said gears as desired, a table for feeding rings to said cutters to form a step-cut in said rings, means for moving said table forwardly from any one of said gears as desired, and resilient means for moving said table rearwardly.

8. A ring cutting machine comprising two offset milling cutters, a table for feeding rings to said cutters to form a step-cut in said rings, a cam for moving said table forwardly, resilient means for moving said table rearwardly, a one revolution clutch, means for setting said clutch in operation when said table moves rearwardly, a clamp, means operated by said clutch for lifting said clamp from said table, means for pushing a ring underneath said clamp when said table is in rearward position, and means for holding said clamp down when said table moves forwardly.

9. A ring cutting machine comprising two offset milling cutters, a table for feeding rings to said cutters to form a step-cut in said rings, a one revolution clutch, means for setting said clutch in operation when said table moves rearwardly, a clamp associated with said table for movement therewith, means operated by said clutch for lifting said clamp from said table, means operated from said clutch for pushing a ring underneath said clamp when said table is in rearward position, and means for holding said clamp down when said table moves forwardly.

10. A ring cutting machine comprising two offset milling cutters, a table for feeding rings to said cutters to form a step-cut in said rings, a one revolution clutch, means for setting said clutch in operation when said table moves rearwardly, a clamp associated with said table for movement therewith, a rock-shaft operated by said clutch for lifting said clamp from said table, a pusher for sliding a ring underneath said clamp when said table is in rearward position, a second rock-shaft operated from said clutch for moving said pusher, and means for holding said clamp down when said table moves forwardly.

11. A ring cutting machine comprising two offset milling cutters, means for adjustably mounting said cutters whereby different sizes thereof may be used, and means for taking rings one at a time from a stack of rings and feeding them to said cutters to form a step cut in said rings by a single cutting operation.

12. A ring cutting machine comprising two offset milling cutters, shafts upon which said cutters are mounted, means whereby the distance between said shafts may be adjusted according to the size of the cutters, and means for taking rings one at a time from a stack of rings and feeding them to said cutters to form a stepcut in said rings by a single cutting operation.

13. A ring cutting machine comprising two offset milling cutters, shafts upon which said cutters are mounted, two pinions secured respectively to said shafts in spaced relation relatively to each other, a driving pinion meshing with one of said driven pinions, a pinion meshing with the other of said driven pinions and also meshing with said driving pinion, means whereby the distance between said shafts may be adjusted according to the size of said cutters, and means for feeding rings to said cutters to form a step-cut in said rings.

14. A ring cutting machine comprising two offset milling cutters, shafts upon which said cutters are mounted, two driven pinions secured respectively to said shafts in spaced relation relatively to each other, a driving pinion meshing with one of said driven pinions, a pinion meshing with the other of said driven pinions and also meshing with said driving pinion, means whereby the distance between said shafts may be adjusted according to the size of said cutters, means for feeding rings to said cutters to form a step-cut in said rings, and means for changing the speed of operation of said driving pinion independently of the speed of operation of said ring-feeding means.

In testimony whereof I hereunto affix my signature.

GEORGE W. OLNEY.